Patented Sept. 26, 1944

2,359,096

UNITED STATES PATENT OFFICE 2,359,096

β-SUBSTITUTED-$\Delta^{\alpha,\beta}$-γ-BUTYROLACTONES AND β-SUBSTITUTED-β-HYDROXY-γ-BUTYROLACTONES AND METHODS OF PREPARING THEM Robert C. Elderfield, Hastings on Hudson, N. Y., assignor to Eli Lilly and Company, Indianapolis, Ind., a corporation of Indiana No Drawing. Application March 21, 1941, Serial No. 384,588

2 Claims. (Cl. 260—239.5)

This invention relates to the preparation of β-substituted-$\Delta^{\alpha,\beta}$-γ-butyrolactones and β-substituted-β-hydroxy-γ-butyrolactones and to the methods of preparing them.

The compositions of this invention are represented by the following formulas:

(1) 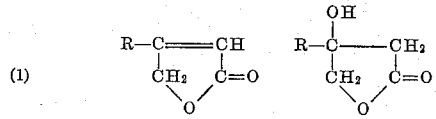

in which R is a member of the class which consists of acyclic and carbocyclic groups.

The compositions of this invention are prepared by reacting a compound represented by the formula:

(2) 

in which R has the same meaning as before and X is a halogen of the class consisting of chlorine and bromine to the action of diazomethane to form a diazomethyl ketone. This action may be represented by the following equation:

(3) $R—CO—X + CH_2N_2 \rightarrow R—CO—CHN_2 + HX$

The reaction is preferably carried out in an inert solvent such as ether and at a temperature from about +50° to —15° C. The diazomethyl ketone is separated from the solvent and treated with an organic acid, such as a monocarboxylic acid, preferably of low molecular weight such as acetic acid, to form an acyloxymethyl ketone. Other acids, such as benzoic acid or nitrobenzoic acid, may be employed. This action may be represented by the following equation:

(4) 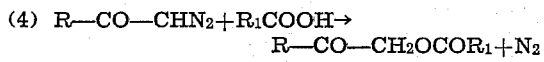

in which $R_1$ is an acyclic or carbocyclic radical, preferably the methyl radical. The acyloxymethyl ketone is reacted with an ester of a haloacetic acid selected from the class which consists of chloroacetic acid, bromoacetic acid, and iodoacetic acid, and preferably bromoacetic acid ($YCH_2—COOR_2$ in which $R_2$ represents an alkyl radical, preferably the methyl or ethyl radical, and Y represents chlorine, bromine or iodine) in the presence of zinc in an inert solvent, such as benzene or toluene. Preferably this mixture is refluxed and the reaction product is cooled to room temperature, treated with an aqueous solution of a mineral acid, such as hydrochloric acid, which is cooled to about 0° C. and separated from the inorganic constituents to yield a mixture of a β-substituted-β-hydroxy-γ-butyrolactone and a β-substituted-$\Delta^{\alpha,\beta}$-γ-butyrolactone. The action which takes place may be represented by the following equations:

(5) 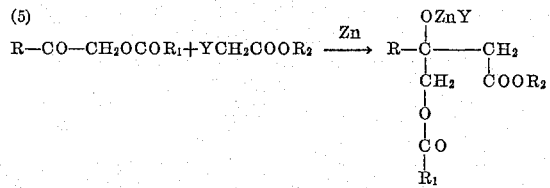

(6) 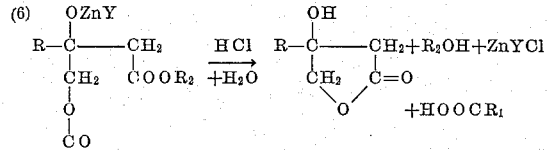

(7) 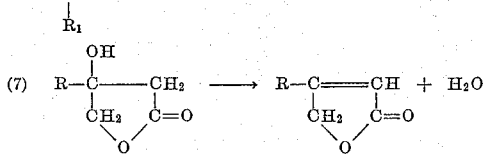

After the cooling and decomposition of the zinc compound by the ice-cold dilute mineral acid, the mixture of lactones is separated and dried. When possible, the β-substituted-β-hydroxy-γ-butyrolactone is separated from the β-substituted-$\Delta^{\alpha,\beta}$-γ-butyrolactone by crystallization. The β-substituted-β-hydroxy-γ-butyrolactone is then subjected to the action of hydrochloric or hydrobromic acid to form a β-substituted-$\Delta^{\alpha,\beta}$-γ-butyrolactone. The action which takes place may be represented by Equation (7). Alternately, the mixture of the two lactones may be subjected to the action of hydrochloric or hydrobromic acid or the mixture may be vacuum distilled to form a β-substituted-$\Delta^{\alpha,\beta}$-γ-butyrolactone only.

Typical examples of the compositions of this invention and the methods of preparing them are as follows:

*Example 1—Preparation of β-phenyl-β-hydroxy-γ-butyrolactone and β-phenyl-$\Delta^{\alpha,\beta}$-γ-butyrolactone*

A solution of 30 g. of freshly distilled benzoyl chloride in 60 cc. of dry ether is added dropwise to an ethereal solution of about 15 to 16 g. of diazomethane, the temperature of the mixture being held at —10° C. The temperature is held at this point for one hour and the mixture is then allowed to stand overnight at room temperature. During this time the desired phenyl-diazomethyl ketone is formed. The solvent is removed from the phenyl diazomethyl ketone. The crude diazoketone is warmed with 25 cc. of glacial acetic acid, preferably at a temperature of from 40° C. to 60° C. until nitrogen is no longer evolved, during which time phenyl acetoxymethyl ketone is formed. After dilution, the ketone is extracted with ether and distilled. The phenyl acetoxymethyl ketone boils at about 118° C. to 122° C., corrected, at 0.7 mm. pressure. It may be recrystallized from petroleum ether and melts at about 48° C. to 49° C., corrected.

Ten grams of freshly distilled ethyl bromoacetate are added dropwise and with vigorous stirring to a mixture of 10 g. of the phenyl acetoxymethyl ketone, 7.7 g. of granulated zinc and 70 cc. of anhydrous benzene in a flask provided with an efficient reflux condenser. The mixture is refluxed for about 2 hours during which time the desired zinc complex is formed. The cooled reaction product is treated with ice-cold dilute hydrochloric acid and the benzene layer which contains the desired $\beta$-phenyl-$\beta$-hydroxy-$\gamma$-butyrolactone and $\beta$-phenyl-$\Delta^{\alpha,\beta}$-$\gamma$-butyrolactone is separated and dried with sodium sulfate. The benzene is removed and the semi-solid residue is freed from the accompanying oil by filtration. The solid residue is the desired $\beta$-phenyl-$\Delta^{\alpha,\beta}$-$\gamma$-butyrolactone. It may be recrystallized, preferably from dilute alcohol or water. It melts at about 92° C., corrected. No depression in melting point is observed when admixed with the $\beta$-phenyl-$\Delta^{\alpha,\beta}$-$\gamma$-butyrolactone prepared by the method described in the copending application of Elderfield and Rubin filed of even date herewith.

The oil obtained by filtration consists largely of the desired $\beta$-phenyl-$\beta$-hydroxy-$\gamma$-butyrolactone. It is subjected to vacuum distillation during which $\beta$-phenyl-$\Delta^{\alpha,\beta}$-$\gamma$-butyrolactone is formed.

The $\beta$-phenyl-$\Delta^{\alpha,\beta}$-$\gamma$-butyrolactone may be represented by the following formula:

(8) 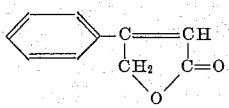

*Example 2—Preparation of $\beta$-phenyl-$\Delta^{\alpha,\beta}$-$\gamma$-butyrolactone by the alternate method*

The crude mixture of the $\beta$-phenyl-$\beta$-hydroxy-$\gamma$-butyrolactone and $\beta$-phenyl-$\Delta^{\alpha,\beta}$-$\gamma$-butyrolactone, obtained exactly as in Example 1, is refluxed with 3 volumes of glacial acetic acid which has been previously saturated with dry hydrogen bromide at 0° C. for about 1 hour, during which the formation of the desired $\beta$-phenyl-$\Delta^{\alpha,\beta}$-$\gamma$-butyrolactone is completed. The cooled solution is poured into ice water and the desired crystalline lactone is filtered off. It may be recrystallized as in Example 1. It melts at about 92° C., corrected.

*Example 3—Preparation of $\beta$-($\beta$-naphthyl)-$\Delta^{\alpha,\beta}$-$\gamma$-butyrolactone*

$\beta$-Naphthyl acetoxymethyl ketone is prepared from $\beta$-naphthoyl chloride in the same manner as the analogous compound described in Example 1, and the ketone is reacted with ethyl bromoacetate in the presence of zinc as described for the analogous compound in Example 1. The crude product of the reaction between $\beta$-naphthyl acetoxymethyl ketone and ethyl bromoacetate and zinc which consists primarily of a mixture of $\beta$-($\beta$-naphthyl)-$\beta$-hydroxy-$\gamma$-butyrolactone and $\beta$-($\beta$-naphthyl)-$\Delta^{\alpha,\beta}$-$\gamma$-butyrolactone is refluxed for about 1 hour with about 3 volumes of glacial acetic acid which has been previously saturated with dry hydrogen bromide at 0° C. The $\beta$-($\beta$-naphthyl)-$\beta$-hydroxy-$\gamma$-butyrolactone in the crude mixture is converted by this reaction into $\beta$-($\beta$-naphthyl)-$\Delta^{\alpha,\beta}$-$\gamma$-butyrolactone. The cooled solution is poured into ice water and the desired crystalline $\beta$-($\beta$-naphthyl)-$\Delta^{\alpha,\beta}$-$\gamma$-butyrolactone is filtered off. The lactone may be recrystallized preferably from alcohol and melts at about 126° C., corrected. Analysis reveals 80.1 percent carbon and 4.8 percent hydrogen which compares with the theoretical values of 80.0 percent carbon and 4.8 percent hydrogen. This lactone is represented by the following formula:

(9) 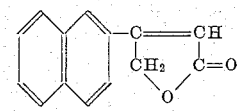

*Example 4—Preparation of $\beta$-cyclohexyl-$\beta$-hydroxy-$\gamma$-butyrolactone and $\beta$-cyclohexyl-$\Delta^{\alpha,\beta}$-$\gamma$-butyrolactone*

Cyclohexylacetoxymethyl ketone is prepared from cyclohexanoyl chloride in the same manner as the analogous compound described in Example 1, and the ketone is reacted with ethyl bromoacetate and zinc as described for the analogous compound in Example 1. The crude product of the reaction between cyclohexylacetoxymethyl ketone and ethyl bromoacetate after removal of the solvent consists of a mixture of a crystalline material and an oil, which mixture contains $\beta$-cyclohexyl-$\beta$-hydroxy-$\gamma$-butyrolactone and $\beta$-cyclohexyl-$\Delta^{\alpha,\beta}$-$\gamma$-butyrolactone. On standing the crystalline material, which is the $\beta$-cyclohexyl-$\beta$-hydroxy-$\gamma$-butyrolactone separates out and is obtained from the accompanying oil by filtration. It may be recrystallized preferably from water and melts at about 112° C., corrected. Analysis reveals 65.3 percent carbon and 8.8 percent hydrogen which compares with theoretical values of 65.3 percent carbon and 8.8 percent hydrogen. This lactone has the following structure:

(10) 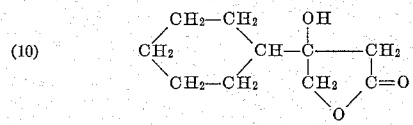

The oily filtrate from the above hydroxylactone is distilled at reduced pressure during which the formation of $\beta$-cyclohexyl-$\Delta^{\alpha,\beta}$-$\gamma$-butyrolactone is completed. The unsaturated lactone is identical in all respects with that prepared by the method described in the copending application of Elderfield and Rubin filed of even date herewith. It has the following formula:

(11) 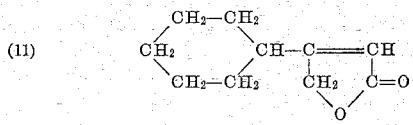

*Example 5—Preparation of $\beta$-cyclohexyl-$\Delta^{\alpha,\beta}$-$\gamma$-butyrolactone*

The crude product of the reaction between cyclohexylacetoxymethyl ketone and ethyl bromoacetate and zinc which is prepared exactly as in Example 4, is warmed at about 40°–50° C. with concentrated hydrochloric acid during which time the desired $\beta$-cyclohexyl-$\Delta^{\alpha,\beta}$-$\gamma$-butyrolactone is formed. The solution is diluted and the lactone is extracted preferably with ether.

Example 6—Preparation of β-cyclohexyl-Δ^{α,β}-γ-butyrolactone by the alternate method The crude product of the reaction between cyclohexylacetoxymethyl ketone and ethyl bromoacetate and zinc is distilled at 0.7 mm. pressure during which the desired β-cyclohexyl-Δ^{α,β}-γ-butyrolactone is formed.

Example 7—Preparation of β-n-butyl-Δ^{α,β}-γ-butyrolactone n-Butylacetoxymethyl ketone is prepared from n-butyryl chloride in the same manner as the analogous compound described in Example 1, and the ketone is reacted with ethyl bromoacetate and zinc as described for the analogous compound described in Example 1. The crude product of the reaction between n-butylacetoxymethyl ketone and ethyl bromoacetate after removal of the solvent is a mixture of the desired β-n-butyl-β-hydroxy-γ-butyrolactone and β-n-butyl-Δ^{α,β}-γ-butyrolactone and is distilled at 0.7 mm. pressure during which the formation of β-n-butyl-Δ^{α,β}-γ-butyrolactone is completed. The latter lactone is identical in all respects with that prepared by the method described in the copending application of Elderfield and Rubin filed of even date herewith. It has the following formula:

(12) 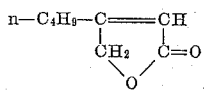

Example 8—Preparation of β-(p-hydroxyphenyl)-Δ^{α,β}-γ-butyrolactone 77 cc. of pure thionyl chloride are added to 24.2 g. of p-acetoxybenzoic acid in a flask equipped with a reflux condenser and protected from moisture by a calcium chloride tube. The mixture is heated at 50° C. for 6 hours and then allowed to stand 16 hours at room temperature. During this time p-acetoxybenzoyl chloride is formed. The excess thionyl chloride is removed under vacuum at 70° C. A solution of 9.9 g. of crude p-acetoxybenzoyl chloride in 70 cc. of dry ether is added to an ethereal solution containing four times the calculated amount of diazomethane at a temperature of about 0° C. and the mixture is allowed to stand at room temperature for 1.5 hours. During this time p-acetoxyphenyldiazomethyl ketone is formed. After removal of the ether from the p-acetoxyphenyldiazomethyl ketone, the crude ketone is mixed with 24 cc. of glacial acetic acid and the resulting mixture is heated on the steam bath for 2½ hours. After standing for a further 16 hours at room temperature, the excess acetic acid is removed in vacuo. During this time p-acetoxyphenyl-ω-acetoxymethyl ketone is formed. The crude ketone may be recrystallized, preferably from benzene and melts at about 96°–97° C., corrected.

A mixture of 7.5 g. of p-acetoxyphenyl-ω-acetoxymethyl ketone, 3.3 g. of granulated zinc and 30 cc. of dry benzene is heated to boiling under reflux. A solution of 5.3 g. of ethyl bromoacetate in 10 cc. of dry benzene is then added dropwise during 15 minutes. The mixture is refluxed for a half hour, during which time the zinc compound is formed and separates as a yellow solid. The benzene is removed in vacuo and the residual zinc compound is treated with 40 cc. of 25 percent hydrochloric acid. On standing, there separates from this acid solution a semisolid mixture of the desired β-(p-acetoxyphenyl)-β-hydroxy-γ-butyrolactone, β-(p-acetoxyphenyl)-Δ^{α,β}-γ-butyrolactone and the deacetylated derivatives of these lactones. The semisolid is extracted with ether, and the residue, after removal of the ether from the extract, is heated on the steam bath with an equal volume of concentrated hydrochloric acid for 1 minute, during which time the β-(p-acetoxyphenyl)-β-hydroxy-γ-butyrolactone and β-(p-acetoxyphenyl)-Δ^{α,β}-γ-butyrolactone are converted to β-(p-hydroxyphenyl)-Δ^{α,β}-γ-butyrolactone. The mixture is then poured into ice water. The desired β-(p-hydroxyphenyl)-Δ^{α,β}-γ-butyrolactone separates as a crystalline precipitate. It may be recrystallized preferably from alcohol and darkness at about 180° C., corrected, and melts at about 256° C., corrected. Analysis reveals 68.1 percent carbon and 4.8 percent hydrogen which compares with theoretical values of 68.2 percent carbon and 4.6 percent hydrogen. The compound has the following formula:

(13) 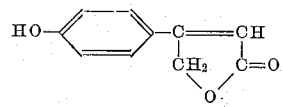

Example 9—Preparation of β-(17-etiocholyl)-β-hydroxy-γ-butyrolactone and β-(17-etiocholyl)-Δ^{α,β}-γ-butyrolactone 300 mg. of etiocholanic acid are dissolved in 2 cc. of pure thionyl chloride at 0° C. Solution requires about 60 hours. The excess unreacted thionyl chloride is removed by distillation in vacuo. During this reaction the etiocholanic acid chloride is formed. The residue, which is the etiocholanic acid chloride, is dissolved in 4 cc. of dry benzene and evaporated to remove traces of thionyl chloride. The melting point of the crude etiocholanic acid chloride thus obtained is about 78°–86° C. The etiocholanic acid chloride is dissolved in 6 cc. of dry benzene and this solution is added at −10° C. to about four molecular equivalents (about 112 mg.) of diazomethane dissolved in 40 cc. of dry ether. It is necessary to exclude moisture during this reaction and accordingly the reaction mixture is protected by a calcium chloride tube. The mixture is maintained at 0° C. for one hour and subsequently at room temperature for about 16 hours. During this reaction, 21-diazopregnanone-20 is formed. The mixture is filtered. The filtrate, which contains the 21-diazopregnanone-20, is evaporated on a steam bath and finally in vacuo to remove the ether and benzene. The 21-diazopregnanone-20 remains as light yellow crystals and melts at about 80°–106° C., corrected. The 21-diazopregnanone-20 is dissolved in 40 cc. of diethyl ether and a steam of dry hydrogen chloride gas is passed for about 10 minutes into this solution, which is cooled to 0° C. During this time, 21-chloropregnanone-20 is formed. The solution containing the 21-chloropregnanone-20 is evaporated on a steam bath to dryness. The residue, which is the 21-chloropregnanone-20, crystallizes readily upon the addition of a few drops of pentane. The 21-chloropregnanone-20 may be recrystallized from absolute ethyl alcohol and melts at about 104°–106° C. Analysis reveals 75.0 percent carbon, 10.2 percent hydrogen, and 10.7 percent chlorine, which compares with the theoretical values of 74.8 percent carbon, 9.9 percent hydrogen, and 10.5 percent chlorine. 100 mg. of 21-chloropregnanone-20 are heated at 150° C. for four hours with 170 mg. of anhydrous potassium acetate dissolved in 1 cc. of glacial acetic acid. During this time, 21-acetoxypregnanone-20 is formed. The acetic acid is removed from the mixture by evaporation in vacuo and the residue, which contains the 21-acetoxypregnanone-20, is extracted with ether to remove the inorganic salts. The ether solution is washed with a water solution of sodium bicarbonate and subsequently dried with anhydrous sodium sulfate. The ether is evaporated on a steam bath and the 21-acetoxypregnanone-20 remains as an oil.

The 21-acetoxypregnanone-20 is dissolved in 2.5 cc. of dry benzene and to this solution are added 160 mg. of ethyl bromoacetate and about one half gram of granulated zinc. This mixture is refluxed for 2 hours, after which another half gram of granulated zinc is added and the mixture is refluxed for an additional 2 hours. During this time, a zinc complex corresponding to the following formula is formed:

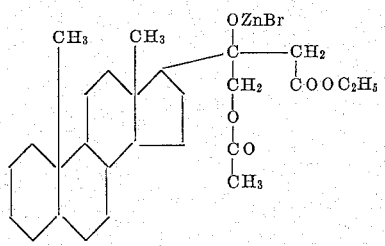

The mixture containing the zinc complex is cooled to room temperature and 5 cc. of 10 percent hydrochloric acid cooled to 0° C. are added to the mixture. During this time $\beta$-hydroxy-$\beta$-(17-etiocholyl)-$\gamma$-butyrolactone and $\beta$-(17-etiocholyl)-$\Delta^{\alpha,\beta}$-$\gamma$-butyrolactone are formed. The mixture of lactones is extracted with ether, both the saturated and unsaturated lactones dissolving in the ether and the benzene contained in the mixture. The water layer is discarded. The ether-benzene layer is washed with a water solution of sodium bicarbonate, dried with anhydrous sodium sulfate and evaporated on a steam bath to dryness in vacuo. In order to complete the dehydration of the $\beta$-hydroxy-$\beta$-(17-etiocholyl-$\gamma$-butyrolactone, the residue is treated with a mixture of 1 cc. of glacial acetic acid and 2 cc. of glacial acetic acid previously saturated with hydrogen bromide at 0° C. The reaction mixture is heated at 100° C. for about 30 minutes, during which time the $\beta$-hydroxy-$\beta$-(17-etiocholyl)-$\gamma$-butyrolactone is converted to $\beta$-(17-etiocholyl)-$\Delta^{\alpha,\beta}$-$\gamma$-butyrolactone. The reaction mixture is evaporated in vacuo on a steam bath, the residue is dissolved in ether, and the ether solution is washed with a water solution of sodium bicarbonate. The ether solution is dried with anhydrous sodium sulfate and the solution evaporated to dryness on a steam bath. The residue is taken up with a mixture of 5 cc. of dry benzene and 5 cc. of dry pentane. The resulting solution is poured through a column of 2 g. of aluminum oxide to remove the impurities. The impurities remain in solution, while the desired lactone is adsorbed on the aluminum oxide. The column is washed with a mixture of 10 cc. of dry benzene and 10 cc. of pentane. The aluminum oxide is then eluted with a mixture of 20 cc. of diethyl ether and 20 cc. of dry pentane. The eluate is evaporated on a steam bath and the residue is the $\beta$-(17-etiocholyl)-$\Delta^{\alpha,\beta}$-$\gamma$-butyrolactone which may be represented by the following formula:

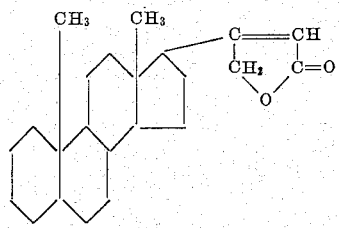

While preferred embodiments of this invention have been described, various modifications may be made therein without departing from the scope of the appended claims.

What is claimed is:

1. $\beta$-($\beta$-naphthyl)-$\beta$-hydroxy-$\gamma$-butyrolactone which is represented by the following formula:

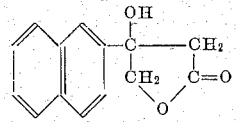

2. The process of preparing a $\beta$-substituted-$\Delta^{\alpha,\beta}$-$\gamma$-butyrolactone which comprises heating a $\beta$-substituted-$\beta$-hydroxy-$\gamma$-butyrolactone in which the substituent is a cyclopentanopolyhydrophenanthrene radical with a hydrohalogen acid selected from the class which consists of hydrochloric acid and hydrobromic acid.

ROBERT C. ELDERFIELD.